United States Patent
Tago (10) Patent No.: US 7,079,389 B2
(45) Date of Patent: Jul. 18, 2006

(54) ELECTRONIC APPARATUS WITH UNIT HAVING INCLINED SURFACE

(75) Inventor: Manabu Tago, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 10/938,577

(22) Filed: Sep. 13, 2004

(65) Prior Publication Data

US 2005/0063148 A1   Mar. 24, 2005

(30) Foreign Application Priority Data

Sep. 24, 2003   (JP) .............................. 2003-332143

(51) Int. Cl.
*G06F 1/16*   (2006.01)
*G08B 5/00*   (2006.01)

(52) U.S. Cl. .................. 361/687; 361/683; 312/223.3; 248/286.1

(58) Field of Classification Search ........ 361/679–682, 361/724–727; 312/223.2–223.3; 235/462.3; 340/815.4; 248/286.1
See application file for complete search history.

(56) References Cited

U.S. PATENT DOCUMENTS

| 4,960,256 | A | * | 10/1990 | Chihara et al. .......... 248/286.1 |
| D368,468 | S | | 4/1996 | Kobayashi ................. D14/100 |
| 5,959,833 | A | | 9/1999 | Youens ....................... 361/681 |
| 5,978,215 | A | * | 11/1999 | Chiu et al. .................. 361/687 |
| 6,917,301 | B1 | * | 7/2005 | Blum et al. .............. 340/815.4 |

\* cited by examiner

*Primary Examiner*—Hung Van Duong
(74) *Attorney, Agent, or Firm*—Pillsbury Winthrop Shaw Pittman, LLP (57) ABSTRACT

An electronic apparatus includes a main unit and a display unit. The main unit having a top surface, a front surface and a left and a right side surfaces. The display unit having a front surface having a display screen, and side surfaces, a top surface and a lower surface. The display unit is rotatable between a first position, where the display unit is laid on the main unit, and a second position where the display unit stands up with respect to the main unit. The front surface and the side surfaces of the main unit form a first inclined surface which is inclined in an inward direction of the main unit toward the top surface. The side surfaces, the top surface and the lower surface of the display unit form a second inclined surface which is inclined in an inward direction of the display unit toward the front surface.

12 Claims, 8 Drawing Sheets

ELECTRONIC APPARATUS WITH UNIT HAVING INCLINED SURFACE

CROSS-REFERENCE TO RELATED APPLICATIONS

This application is based upon and claims the benefit of priority from prior Japanese Patent Application No. 2003-332143, filed Sep. 24, 2003, the entire contents of which are incorporated herein by reference.

BACKGROUND OF THE INVENTION

1. Field of the Invention

This invention relates to an electronic apparatus such as a notebook portable computer, in particular, a structure for allowing a main unit having a keyboard or a display unit having a display screen to look compact.

2. Description of the Related Art

Multifunctional portable computers are equipped with a multidrive, which is a combination of a CD-ROM drive and a DVD-ROM drive, and a TV tuner. Thereby, one portable computer can not only play back music stored in music CDs and movies stored in DVDs, but also view and record TV programs.

Portable computers of this kind have a large-sized liquid crystal display panel with high image quality and a stereo speaker system with high audio quality. A multidrive and a stereo speaker system are housed in a main unit of such a portable computer. A liquid crystal display panel is housed in a display unit of a portable computer. Therefore, the multifunctional portable computers tend to have a main unit and a display unit which are greater in size than those of standard portable computers. As a result, the multifunctional portable computers can look too large, and causes uncomfortable feeling in respect of appearance.

To deal with this problem, known is a conventional portable computer having an inclined top surface which is located on a top end of a display unit when the display unit is raised such that a display screen of the liquid crystal display panel is opposed to the operator (for example, refer to U.S. Pat. No. 5,959,833).

Further, as another example, known is a portable computer in which a corner portion defined by a top surface and a front surface of the main unit is obliquely cut away (for example, refer to U.S. Design Registration No. 368,468).

According to the above U.S. patent, when the display unit is raised, the top surface of the display unit is inclined downward toward the operator. Thereby, the front surface of the display unit, in which the display screen is located, looks smaller.

In the above U.S. patent, although the display unit has a rectangular box shape, only the top surface thereof is inclined. In other words, the left side surface and the right side surface of the display unit remain square to the front surface. Therefore, when the display unit is raised, the width of the front surface of the display unit can look broader. Thus, the effect of making the front surface of the display unit look smaller is insufficient.

In the same manner, also in the above U.S. design, the corner portions defined by the top surface and the left and right side surfaces of the main unit remain right-angled. Therefore, when the display unit is raised to expose the top surface of the main unit, the width of the top surface of the main unit can look broader. Thus, the effect of making the front surface of the main unit look smaller is insufficient.

BRIEF SUMMARY OF THE INVENTION

According to an embodiment of the present invention, there is provided an electronic apparatus comprises: a main unit having a top surface, a front surface and a left and a right side surfaces; and a display unit having a front surface having a display screen, and a peripheral surface located around the front surface, the display unit being rotatable between a first position, where the display unit is laid on the main unit, and a second position where the display unit stands up with respect to the main unit.

The front surface and the side surfaces of the main unit form a first inclined surface which is inclined in an inward direction of the main unit toward the top surface of the main unit. The peripheral surface of the display unit form a second inclined surface which is inclined in an inward direction of the display unit toward the front surface of the display unit.

BRIEF DESCRIPTION OF THE SEVERAL VIEWS OF THE DRAWING

The accompanying drawings, which are incorporated in and constitute a part of the specification, illustrate presently embodiments of the invention, and together with the general description given above and the detailed description of the preferred embodiments given below, serve to explain the principles of the invention.

DETAILED DESCRIPTION OF THE INVENTION

A first embodiment of the present invention is explained below with reference to FIGS. 1 to 7.

FIGS. 1 to 4 disclose a A4-size portable computer 1 serving as electronic apparatus. The portable computer 1 comprises a main unit 2, a display unit 3 and a support member 4.

The main unit 2 has a first housing 5 having a flat box shape. The first housing 5 comprises a lower housing 6 and an upper housing 7. The upper housing 7 has a top surface 8, a front surface 9, a left and a right side surfaces 10a and 10b, and a rear surface 11. The upper housing 7 covers the lower housing 6 from above.

Figure 5:
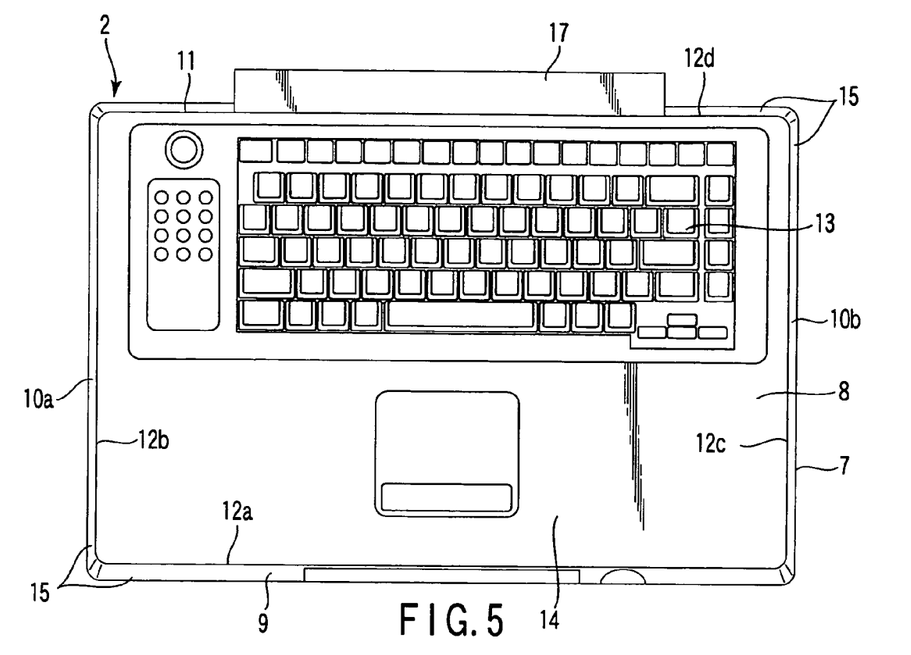
FIG. 5 is a plan view of a main unit according to the first embodiment of the present invention.

The top surface 8 of the upper housing 7 has a rectangular shape having first to fourth edges 12a, 12b, 12c and 12d. The first edge 12a is located at a front end of the upper housing 7. The fourth edge 12d is located at a rear end of the upper housing 7. The first and fourth edges 12a and 12d extend in parallel with each other along the width direction of the upper housing 7. The second edge 12b is located at a left end of the upper housing 7. The third edge 12c is located at a right end of the upper housing 7. The second and the third edges 12b and 12c extend in parallel with each other along the depth direction of the upper housing 7.

The top surface 8 of the upper housing 7 supports a keyboard 13. The keyboard 13 is an example of an input device for inputting information. The keyboard 13 is located in a rear half portion of the top surface 8. A front half portion of the top surface 8 also serves as a palm rest 14 on which the operator places one's hands when operating the keyboard 13. The palm rest 14 is located in front of the keyboard 13. The first edge 12a of the top surface 8 is located at the front end of the palm rest 14.

The front surface 9 of the upper housing 7 extends downward from the first edge 12a of the top surface 8. The left and right side surfaces 10a and 10b of the upper housing 7 extend downward from the second edge 12b and the third edge 12c, respectively, of the top surface 8. The rear surface 11 of the upper housing 7 extends downward from the fourth edge 12d of the top surface 8.

The front surface 9, the side surfaces 10a and 10b and the rear surface 11 of the upper housing 7 form a first inclined surface 15, which is inclined in an inward direction of the upper housing 7 as it goes toward the top surface 8. In other words, the first inclined surface 15 is inclined such that it projects outside the upper housing 7 as it goes downward from the first to fourth edges 12a to 12d of the top surface 8, and continues in the peripheral direction of the upper housing 7. Therefore, as shown in FIG. 5, the external peripheral portion of the upper housing 7 is narrowed toward the top surface 8 from the four directions.

The first housing 5 holds a multidrive 16, which is a combination of a CD-ROM drive and a DVD-ROM drive, a printed wiring board with a CPU and other electronic parts (not shown). The multidrive 16 and the electronic parts are supported by the lower housing 6.

Figure 1:
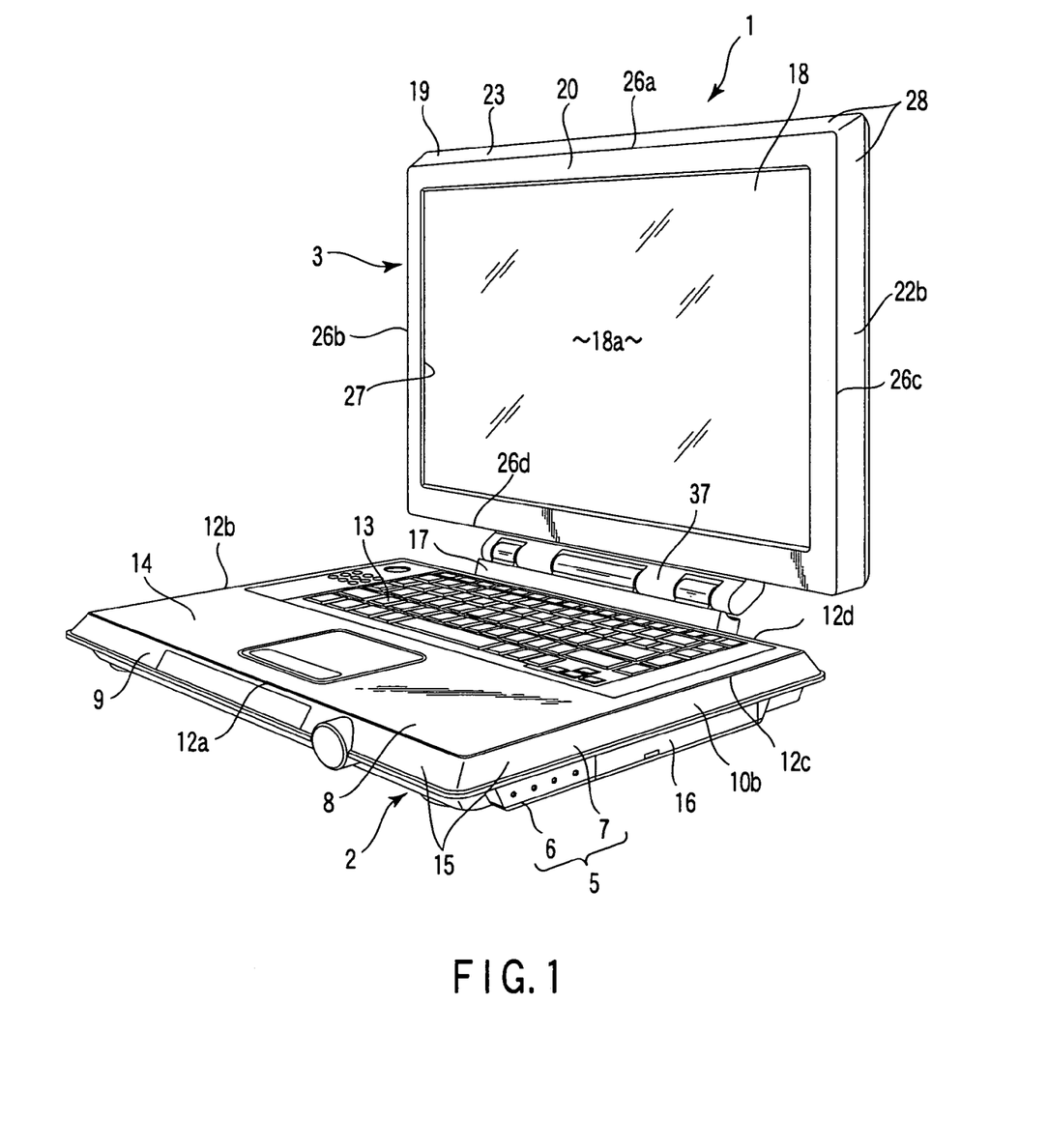
FIG. 1 is a perspective view of a portable computer according to a first embodiment of the present invention, illustrating a state where a display unit is rotated to a second position.
Figure 2:
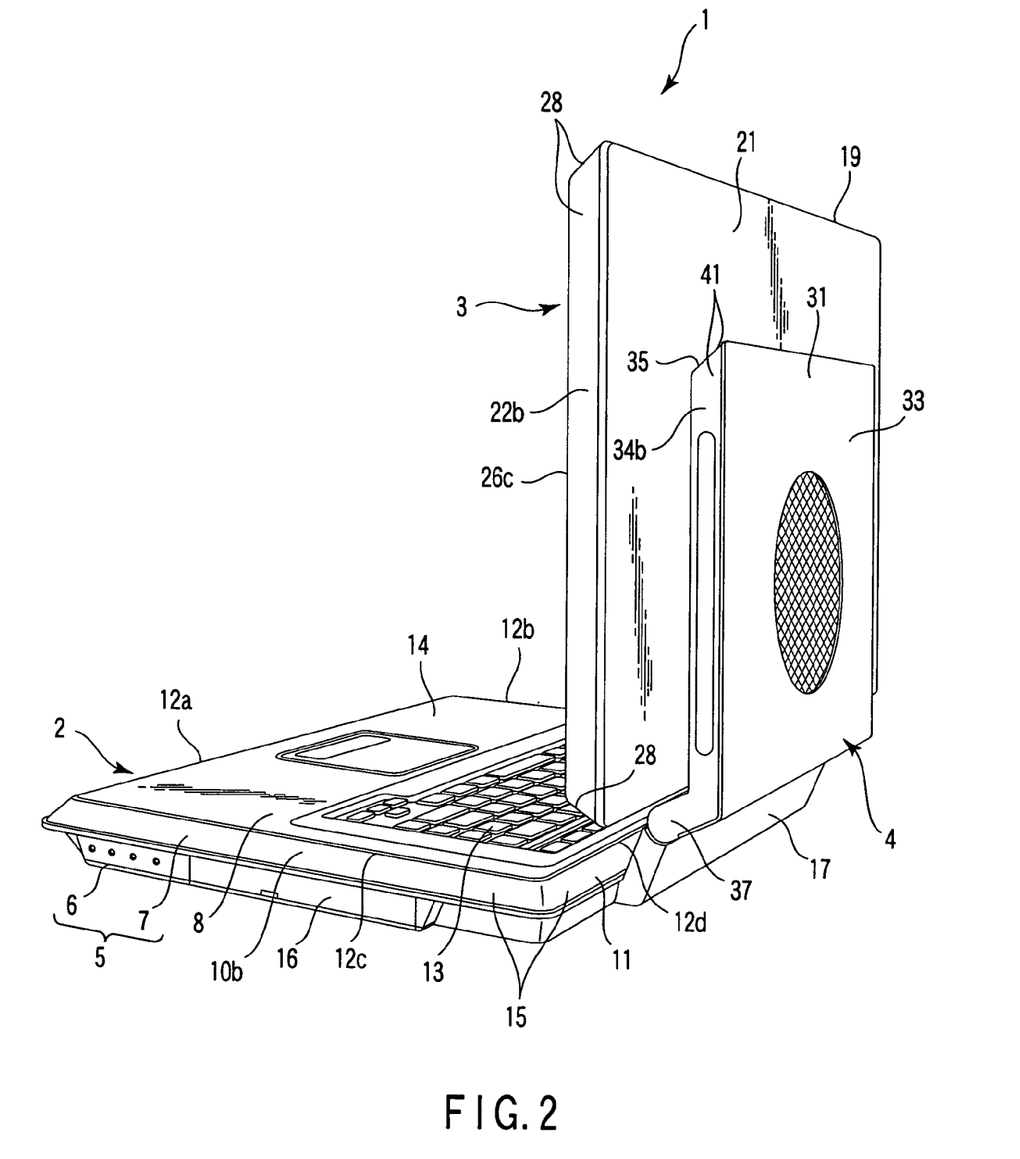
FIG. 2 is another perspective view of the portable computer according to the first embodiment of the present invention, illustrating the state where the display unit is rotated to the second position.
Figure 4:
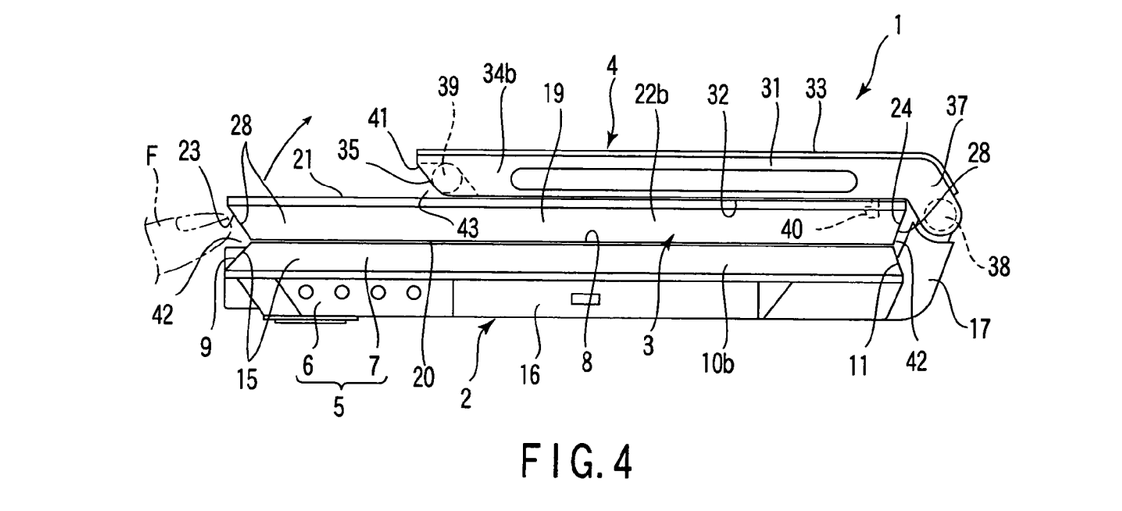
FIG. 4 is a side view of the portable computer according to the first embodiment of the present invention, in the state where the display unit is rotated to the first position.

As shown in FIGS. 1, 2 and 4, a mounting seat 17 is formed at the rear end of the first housing 5. The mounting seat 17 is located in a central portion along the width direction of the first housing 5, and projects upward from the top surface 8 of the upper housing 7.

The display unit 3 is one constituent element independent of the main unit 2. The display unit 3 has a liquid crystal display panel 18 and a second housing 19. The liquid crystal display panel 18 has a rectangular display screen 18a which displays images. The second housing 19 has a flat box shape having a front surface 20, a back surface 21, a left and a right side surfaces 22a and 22b, a top surface 23 and a lower surface 24, and holds the liquid crystal display panel 18. The side surfaces 22a and 22b, the top surface 23 and the lower surface 24 are an example of a peripheral surface of the second housing 19.

Figure 6:
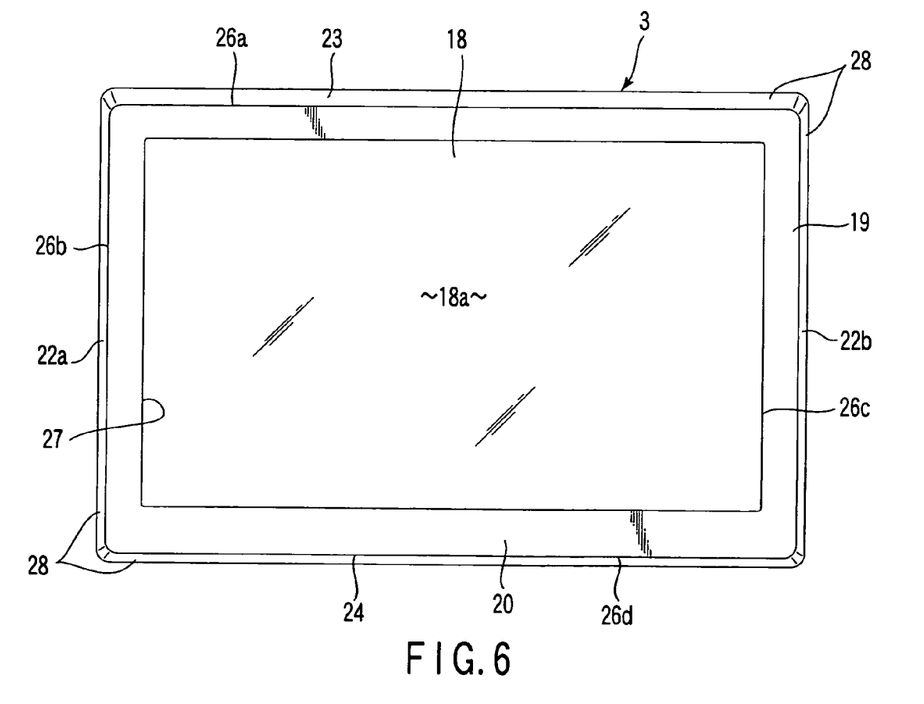
FIG. 6 is a front view of the display unit according to the first embodiment of the present invention.

The second housing 19 has almost the same size as that of the first housing 5. The front surface 20 of the second housing 19 has a rectangular shape having first to fourth edges 26a, 26b, 26c and 26d. The first edge 26a is located at an upper end of the second housing 19. The fourth edge 26d is located at a lower end of the second housing 19. The first and fourth edges 26a and 26d extend in parallel with each other along the width direction of the second housing 19. The second edge 26b is located at a left end of the second housing 19. The third edge 26c is located at a right end of the second housing 19. The second and third edges 26b and 26c extend in parallel with each other along the height direction of the second housing 19.

The front surface 20 of the second housing 19 has a rectangular opening 27 which exposes the display screen 18a. The opening 27 is surrounded by the first to fourth edge portions 26a to 26d. Therefore, the front surface 20 of the second housing 19 has a rectangular frame shape.

The side surfaces 22a and 22b of the second housing 19 extend from the second edge 26b and the third edge 26c, respectively, of the front surface 20 toward the back surface 21. The top surface 23 of the second housing 19 extends from the first edge portion 26a of the front surface 20 toward back surface 21. The lower surface 24 of the second housing 19 extends from the fourth edge 26d of the front surface 20 toward the back surface 21.

The side surfaces 22a and 22b, the top surface 23 and the lower surface 24 of the second housing 19 form a second inclined surface 28, which is inclined in the inward direction of the second housing 19 from the back surface 21 toward the front surface 20. In other words, the second inclined surface 28 is inclined to project in the outside direction of the second housing 19 from the first to fourth edges 26a to 26d of the front surface 20 toward the back surface 21, and continues in the peripheral direction of the second housing 19. Therefore, as shown in FIG. 6, the external peripheral portion of the second housing 19 is narrowed from the four directions toward the front surface 20.

Figure 7:
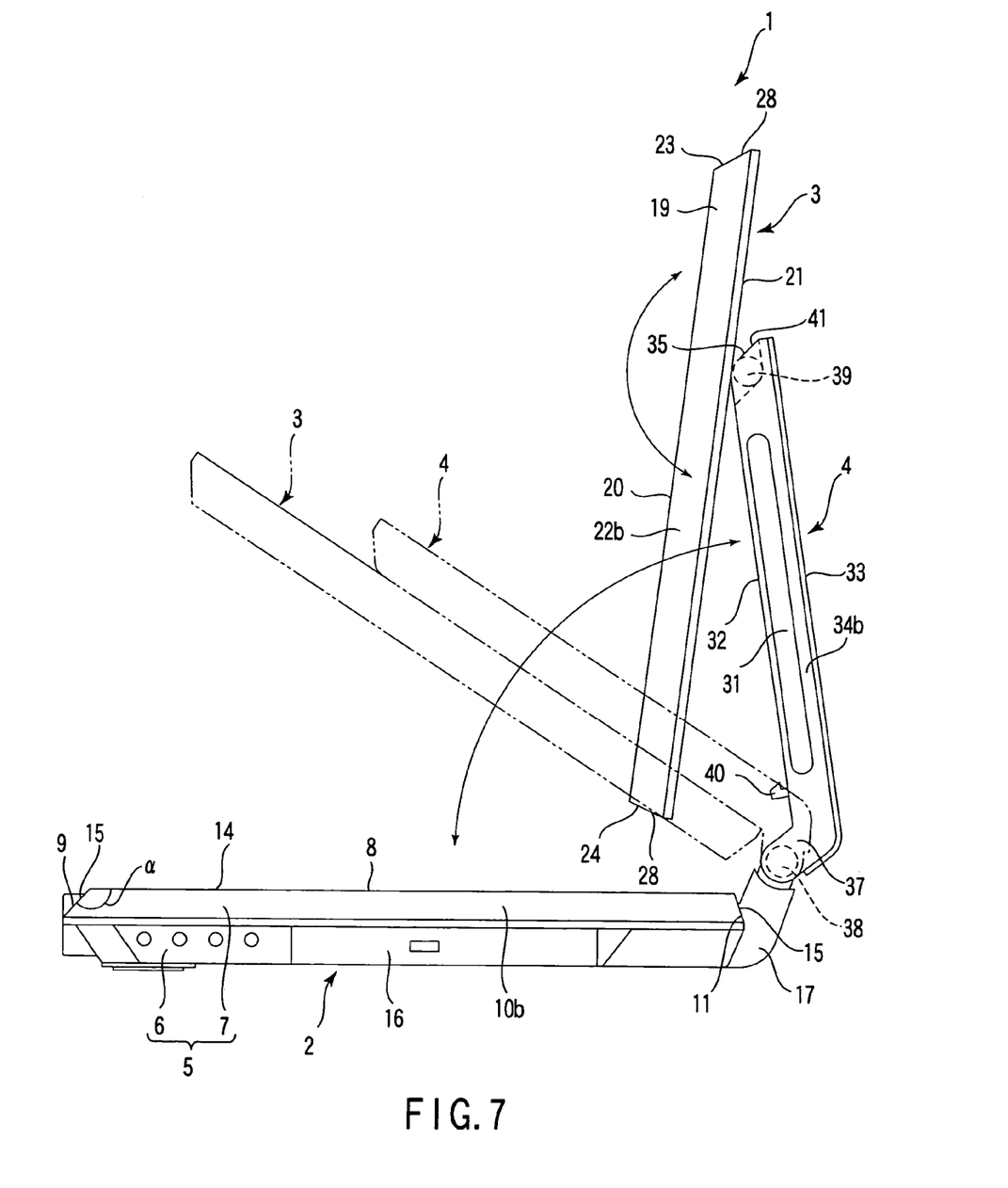
FIG. 7 is a side view of the portable computer according to the first embodiment of the present invention, illustrating a state where the display unit is rotated to the second position.

As shown in FIGS. 2, 4 and 7, the support member 4 extends over the main unit 2 and the display unit 3. The support member 4 has a third housing 31. The third housing 31 has a shape of a flat box smaller than the second housing 19, and has a front surface 32, a back surface 33, a left and a right side surfaces 34a and 34b, and a top surface 35. The side surfaces 34a and 34b and the top surface 35 are an example of a peripheral surface of the third housing 31.

The third housing 31 has a leg portion 37 at one end. The leg portion 37 projects toward the mounting seat 17, and is rotatably connected with the mounting seat 17 by a first hinge shaft 38. The first hinge shaft 38 is horizontally disposed along the width direction of the main unit 2. Further, the third housing 31 has the other end which is located on the opposite side of the leg portion 37. The other end of the third housing 31 is rotatably connected with the back surface 21 of the second housing 19 of the display unit 3 by a second hinge shaft 39. The second hinge shaft 39 is located in the vicinity of the top surface 35 of the third housing 31, and horizontally disposed along the width direction of the display unit 3.

Figure 3:
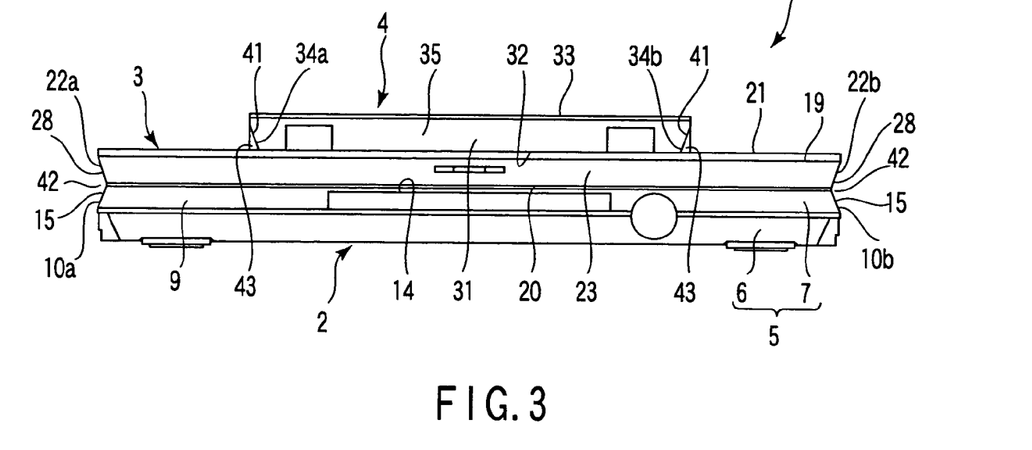
FIG. 3 is a front view of the portable computer according to the first embodiment of the present invention, in a state where the display unit is rotated to a first position.

Therefore, the display unit 3 is connected with the main unit 2 by the support member 4 interposed therebetween, and is rotatable between a first position and a second position. FIGS. 3 and 4 show the state where the display unit 3 is rotated to the first position. In the first position, the display unit 3 is laid on the display unit 2, and the front surface 9 of the display unit 3 faces the keyboard 13 and the palm rest 14. In the state where the display unit 3 is rotated to the first position, the support member 4 is laid on the second housing 19. Thereby, a hook 40 projecting from the front surface 32 of the third housing 31 is detachably hooked with the back surface 21 of the second housing 19, and limits relative rotation of the second housing 19 and the third housing 31.

FIGS. 1 and 2 show the state where the display unit 3 is rotated to the second position. In the second position, the display unit 3 stands from the rear end of the main unit 2 to expose the keyboard 13, the palm rest 14 and the display screen 18a. In the state where the display unit 3 is in the second position, the display screen 18a faces the operator.

In the state where the display unit 3 is in the second position, the support member 4 stands behind the display unit 3, and the display unit 3 is rotatable alone with the second hinge shaft 39 used as axis of rotation. Therefore, as shown in FIG. 7, the standing angle of the display unit 3 can be changed at discretion.

As shown in FIGS. 2 to 4, the side surfaces 34a and 34b and the top surface 35 of the third housing 31 form a third inclined surface 41, which is inclined in the inward direction of the third housing 31 from the back surface 33 toward the front surface 32. The third inclined surface 41 continues in the peripheral direction of the third housing 31.

As shown in FIGS. 3 and 4, in the state where the display unit 3 is rotated to the first position, the second inclined surface 28 of the second housing 19 faces the first inclined surface 15 of the first housing 5. The first and second inclined surfaces 15 and 28 cooperate with each other to form a recess 42 in the external peripheral portion of the portable computer 1. The recess 42 continuously opens to the front, the sides, and the rear of the portable computer 1. In addition, the recess 42 has a shape which spreads out forward, sideward, and rearward of the portable computer 1, such that a fingertip F of the operator's hand can be inserted into the recess 42.

In the state where the display unit 3 is in the first position, the third inclined surface 41 of the third housing 31 is opposed to the back surface 21 of the second housing 19. The third inclined surface 41 forms a recess 43 with the back surface 21 of the second housing 19. The recess 43 is opened around the third housing 31, such that the operator's fingertip can be inserted into the recess 43.

In the portable computer 1 having the above structure, when the display unit 3 is rotated to the second position, the front surface 20 of the second housing 19, which has the display screen 18a, is opposed to the operator. Simultaneously, the top surface 8 of the first housing 5, which has the keyboard 3 and the palm rest 14, is exposed.

The front surface 9, the side surfaces 10a and 10b and the rear surface 11 of the upper housing 7 of the first housing 5 form the first inclined surface 15, which is inclined in the inward direction of the upper housing 7 toward the top surface 8. Therefore, the external peripheral portion of the upper housing 7 has a shape narrowed from the four directions toward the top surface 8. This allows the top surface 8 of the upper housing 7 to look compact.

In the meantime, the side surfaces 22a and 22b, the top surface 23 and the lower surface 24 of the second housing 19 form the second inclined surface 28, which is inclined in the inward direction of the second housing 19 toward the front surface 20. Therefore, the external peripheral portion of the second housing 19 has a shape narrowed from the four directions toward the front surface 20. This allows the front surface 20 to look compact.

Simultaneously, the presence of the second inclined surface 28 allows the first to fourth edges 26a to 26d of the front surface 20 to be closer to the edges of the opening 27. Therefore, the frame-shaped front surface 20 is narrowed, and it allows the display screen 18a of the liquid crystal display panel 18 to look larger by an optical illusion.

Therefore, even if the top surface 8 of the main unit 2 and the front surface 20 of the display unit 3 are viewed from any directions, the main unit 2 and the display unit 3 can be made look smaller. This enables solution of the problem causing uncomfortable feeling in the conventional art that the portable computer 1 looks excessively large.

Further, when the display unit 3 is rotated to the first position, the recess 42 open to the surroundings of the portable computer 1 is formed between the first inclined surface 15 of the first housing 5 and the second inclined surface 28 of the second housing. 19. Therefore, when the fingertip F is hooked onto the recess 42 to raise the second housing 19, the second housing 19 is rotated upward with the first hinge shaft 38 used as rotation axis, and thereby the display unit 3 is stood up.

Furthermore, since the recess 42 extends over the whole periphery of the portable computer 1, the fingertip F can be hooked onto the recess 42 from any of the directions, that is, from the top surface 23 side and the side surfaces 22a and 22b sides of the second housing 19. Therefore, the operation to rotate the display unit 3 from the first position to the second position can be easily performed, and the display unit 3 can be promptly stood up at a desired angle.

In addition, according to the above structure, as long as the display unit 3 is in the first position, the recess 43 open to the surroundings of the portable computer 1 exists between the inclined surface 41 of the third housing 31 and the back surface 21 of the second housing 19. Therefore, when the fingertip F is hooked onto the recess 43 and the third housing 31 is raised, the third housing 31 is rotated upward, with the first hinge shaft 38 used as rotation axis.

In this operation, the third housing 31 is connected to the second housing 19 by the hook 40. Therefore, the second housing 19 is rotated toward the second position, following the third housing 31. It is thus possible to easily rotate the display unit 3 from the first position to the second position, and the operability is improved.

In the above first embodiment, as shown in FIG. 7, the angle α defined by the front surface 9 and the palm rest 14 of the first housing 5 is an obtuse angle. This smoothly connects the palm rest 14 with the front surface 9. In other words, the right-angled corner projecting from the boundary between the front end of the palm rest 14 and the front surface 9 can be removed. Therefore, when the operator operates the keyboard 13 with one's hands put on the palm rest 14, it has the advantage that the operator's hands do not touch a pointed corner which pains the hands.

Figure 8:
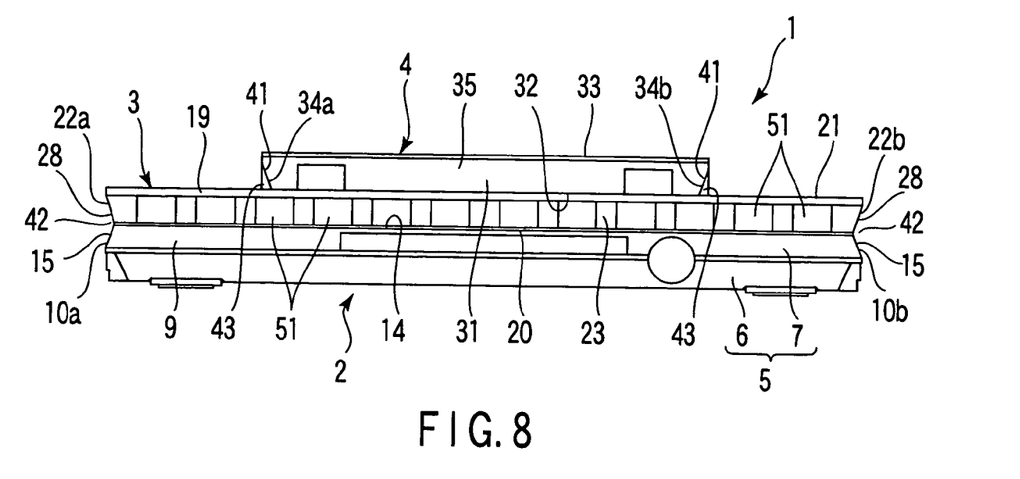
FIG. 8 is a front view of a portable computer according to a second embodiment of the present invention, in a state where a display unit is rotated to a first position.
Figure 9:
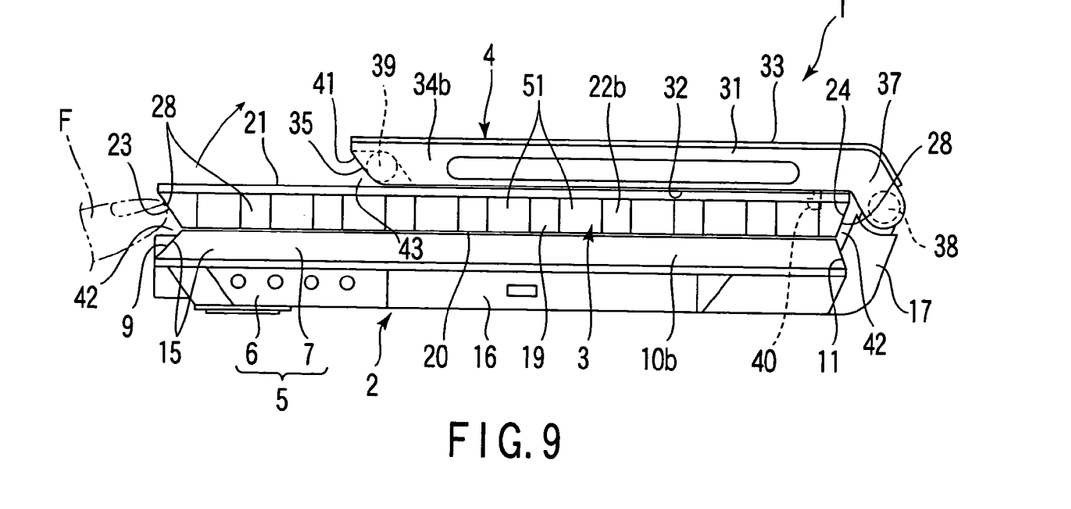
FIG. 9 is a side view of the portable computer according to the second embodiment of the present invention, in the state where the display unit is rotated to the first position.
Figure 10:
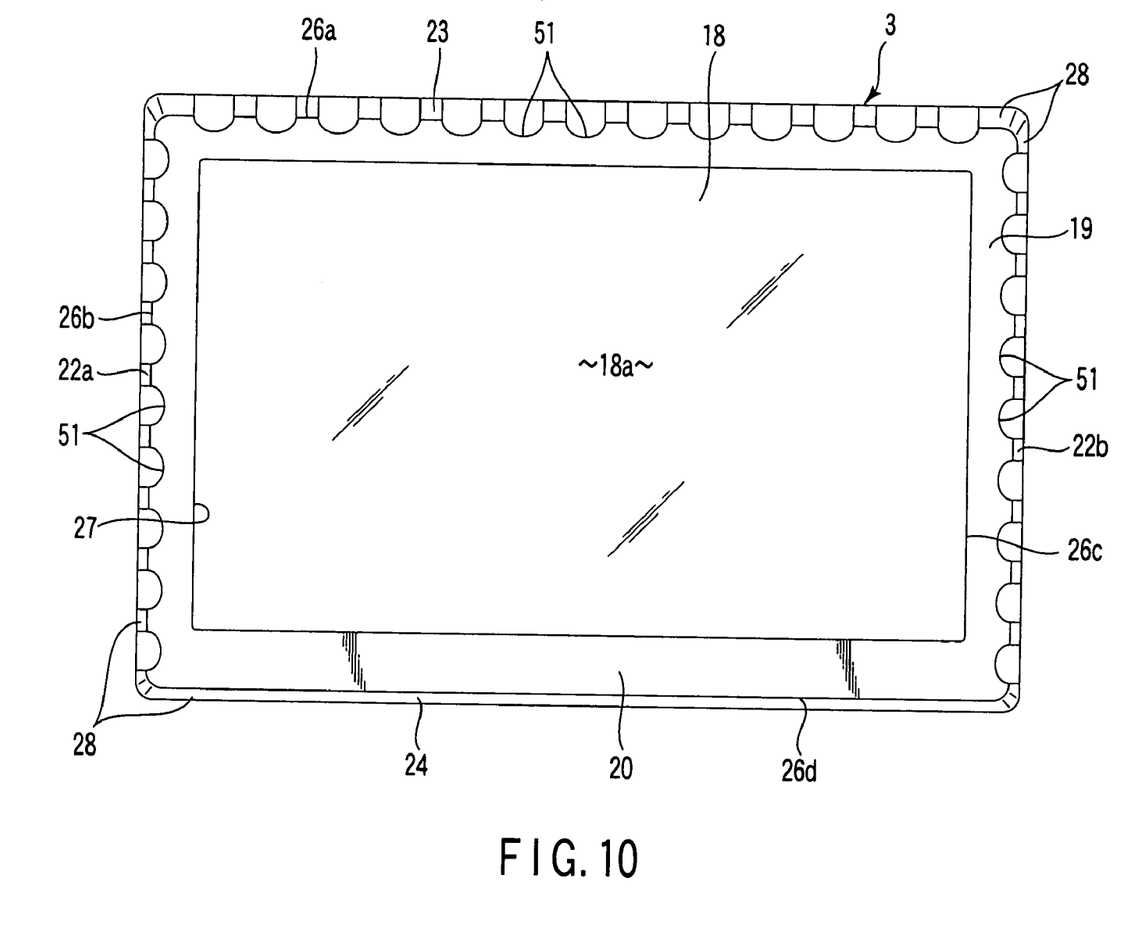
FIG. 10 is a front view of the display unit according to the second embodiment of the present invention.

The present invention is not limited to the first embodiment. FIGS. 8 to 10 disclose a second embodiment of the present invention.

In the second embodiment, a plurality of hollows 51 are formed in a top surface 23 and side surfaces 22a and 22b of a second housing 19 of a display unit 3. Each of the hollows 51 is curved like an arc to conform to the shape of a fingertip F, and open in the second inclined surface 28. The hollows 51 are arranged at intervals in the peripheral direction of the second housing 19. Therefore, in the state where the display unit 3 is in the second position, the hollows 51 are located above and on the right and left sides of the display screen 18a.

According to the above structure, when the display unit 3 is to be rotated from the first position to the second position, the fingertip F enters any of the hollows 51. Therefore, the second inclined surface 28 fits the fingertip F and prevents the fingertip F from slipping, and thus the operator can easily hook the fingertip F onto the display unit 3. This further improves the operability in rotation of the display unit 3 from the first position to the second position.

Figure 11:
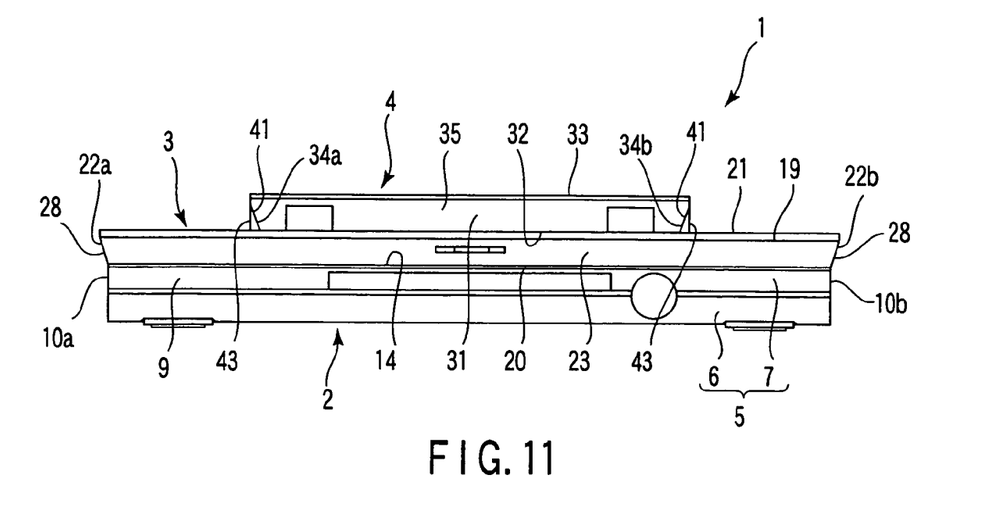
FIG. 11 is a front view of a portable computer according to a third embodiment of the present invention, in a state where a display unit is rotated to a first position.
Figure 12:
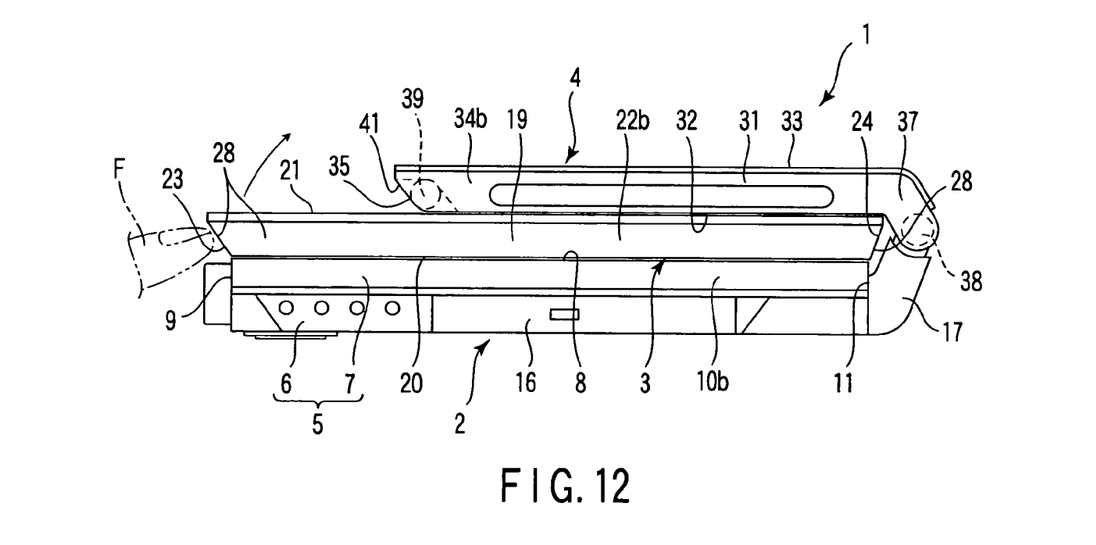
FIG. 12 is a side view of the portable computer according to the third embodiment of the present invention, in the state where the display unit is rotated to the first position.

FIGS. 11 and 12 disclose a third embodiment of the present invention.

In the third embodiment, a front surface 9, side surfaces 10a and 10b and a rear surface 11 of a first housing 5 stand perpendicular to a top surface 8. Further, a second inclined surface 28 of a second housing 19 projects outward more than the front surface 9, the side surfaces 10a and 10b and the rear surface 11 of the first housing 5, from a display unit 3, when the display unit 3 is rotated to the first position.

Also in the above structure, when the display unit 3 is to be rotated from the first position to the second position, a fingertip F can be hooked onto the second inclined surface 28. Further, since the second inclined surface 28 extends over the whole periphery of the display unit 3, the operator can hook the fingertip F onto the second inclined surface 28 from any of the directions, that is, from the top surface 23 side and the left and right side surfaces 22a and 22b sides of the second housing 19. Therefore, the operation to rotate the display unit 3 from the first position to the second position can be easily performed, and the display unit 3 can be promptly raised at a desired angle.

In each of the above embodiments, although the display unit is rotatably connected to the main unit by the support member, the present invention is not limited to it. For example, one end of the display unit may be rotatably connected to the rear end of the main unit with a hinge.

Further, the first inclined surface is not necessarily provided over the whole periphery of the first housing. It suffices that the first inclined surface is provided at least on the front surface and the right and left side surfaces of the first housing. In the same manner, the second inclined surface is not necessarily provided over the whole periphery of the second housing. It suffices that the second inclined surface is provided at least on the top surface and the left and right side surfaces of the second housing.

The electronic apparatus of the present invention is not limited to those having a main unit and a display unit. For example, it may be a pen-based electronic apparatus, wherein a tablet serving as an input/display screen is provided on the top surface of the main unit.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An electronic apparatus comprising:
   a main unit having a top surface, a front surface and a left and a right side surfaces; and
   a display unit having a front surface having a display screen, and a peripheral surface located around the front surface, the display unit being rotatable between a first position, where the display unit is laid on the main unit, and a second position where the display unit stands up with respect to the main unit,
   wherein the front surface and the side surfaces of the main unit form a first inclined surface which is inclined in an inward direction of the main unit toward the top surface of the main unit, and the peripheral surface of the display unit form a second inclined surface which is inclined in an inward direction of the display unit toward the front surface of the display unit.

2. The electronic apparatus according to claim 1, wherein the front surface of the display unit has first to fourth edges, and an opening which is surrounded by the first to fourth edges and exposes the display screen, and the peripheral surface of the display unit connect with the first to fourth edges.

3. The electronic apparatus according to claim 1, wherein the second inclined surface of the display unit faces the first inclined surface of the main unit when the display unit is rotated to the first position, and the first and second inclined surfaces cooperate with each other to form a recess open to surroundings of the electronic apparatus.

4. The electronic apparatus according to claim 1, wherein the first inclined surface of the main unit continues in a peripheral direction of the main unit, and the second inclined surface of the display unit continues in a peripheral direction of the display unit.

5. The electronic apparatus according to claim 1, wherein the second inclined surface of the display unit has a plurality of hollows, the hollows being arranged at intervals in the peripheral direction of the display unit.

6. The electronic apparatus according to claim 3, wherein the recess has a shape to spread out toward the surroundings of the electronic apparatus.

7. An electronic apparatus comprising:
   a main unit having a top surface, a front surface and a left and a right side surfaces; and
   a display unit having a front surface having a display screen, and a peripheral surface located around the front surface, the display unit being rotatable between a first position, where the display unit is laid on the main unit, and a second position where the display unit stands up with respect to the main unit,
   wherein the peripheral surface of the display unit form an inclined surface which is inclined in an inward direction of the display unit toward the front surface of the display unit, and the inclined surface projects to surroundings of the main unit more than the front surface and the side surfaces of the main unit when the display unit is rotated to the first position.

8. An electronic apparatus comprising:
   a first housing having a top surface, a front surface and a left and a right side surfaces;
   a second housing having a front surface having a display screen, and a peripheral surface located around the front surface; and
   a third housing which connects the first housing and the second housing and has a peripheral surface,
   wherein the front surface and the side surfaces of the first housing form a first inclined surface which is inclined in an inward direction of the first housing toward the top surface of the first housing, the peripheral surface of the second housing form a second inclined surface which is inclined in an inward direction of the second housing toward the front surface of the second housing, and the peripheral surface of the third housing form a third inclined surface which is inclined in an inward direction of the third housing toward the second housing.

9. The electronic apparatus according to claim 8, wherein the second housing is rotatable between a first position, where the front surface of the second housing is laid on the first housing and faces the top surface of first housing, and a second position wherein the front surface of the second housing stands up with respect to the first housing and is opposed to an operator, and the third housing is laid on the second housing when the second housing is rotated to the first position, and stands up behind the second housing when the second housing is rotated to the second position.

10. The electronic apparatus according to claim 8, wherein the first inclined surface of the first housing continues in a peripheral direction of the first housing, and the second inclined surface of the second housing continues in a peripheral direction of the second housing.

11. The electronic apparatus according to claim 9, wherein the third housing has one end which is rotatably connected to the first housing by a first hinge shaft, and the other end which is rotatably connected to the second housing by a second hinge shaft.

12. The electronic apparatus according to claim 9, wherein the second inclined surface of the second housing faces the first inclined surface of the first housing when the second housing is rotated to the first position, the first and the second inclined surfaces cooperate with each other to form a recess open to surroundings of the electronic apparatus, and the recess has a shape which spreads out toward the surroundings of the electronic apparatus.

* * * * *